H. I. FINCH.
ELECTRIC MOTOR SHORT CIRCUITING MECHANISM.
APPLICATION FILED JUNE 12, 1920.
1,435,827.
Patented Nov. 14, 1922.
2 SHEETS—SHEET 2.
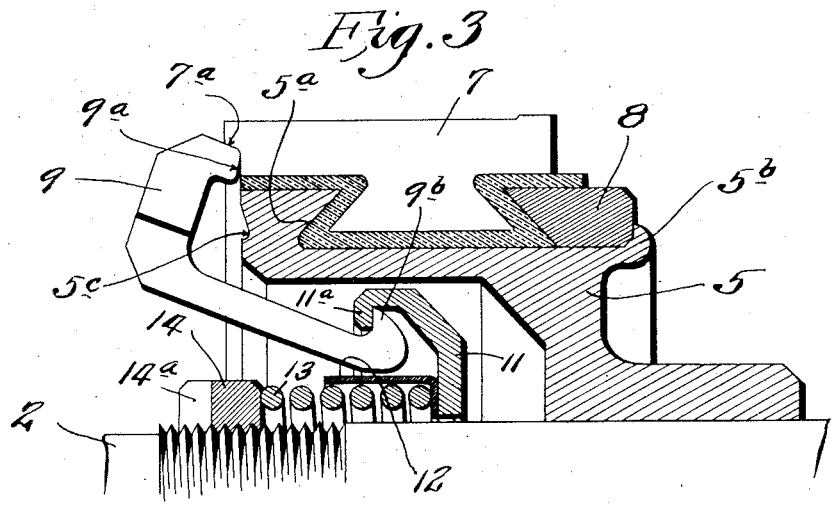
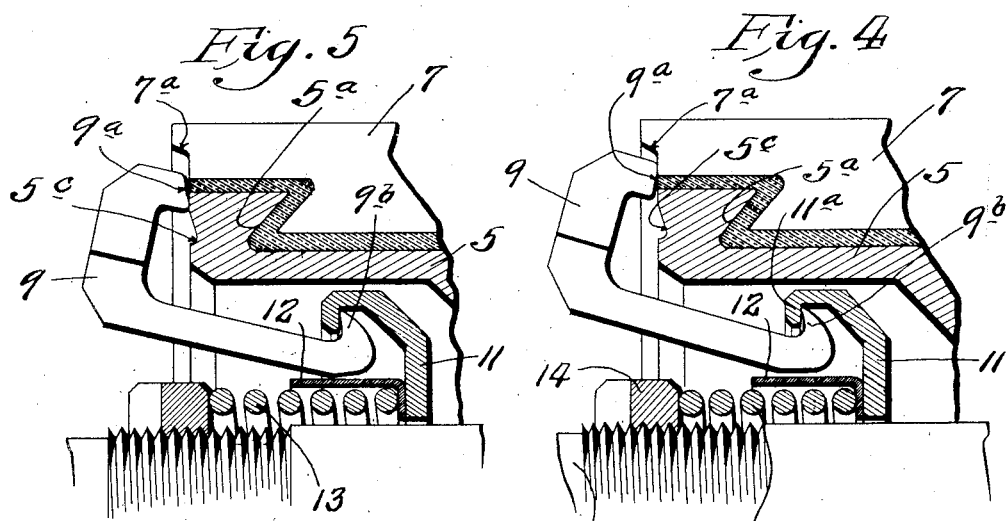
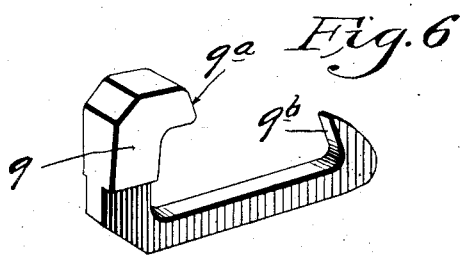
Inventor
Herbert I. Finch
By [signature] Atty Patented Nov. 14, 1922.

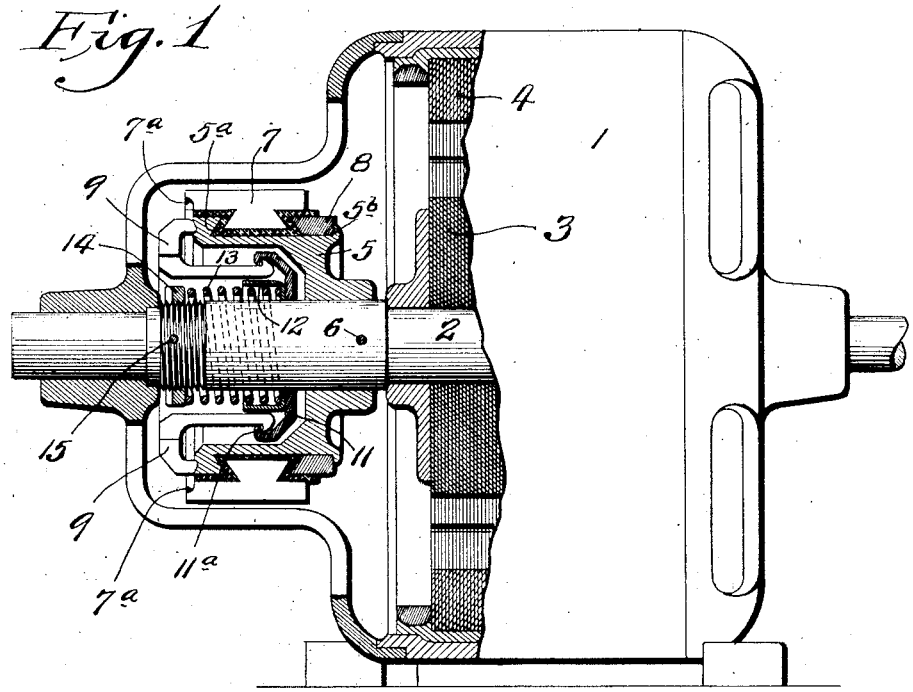
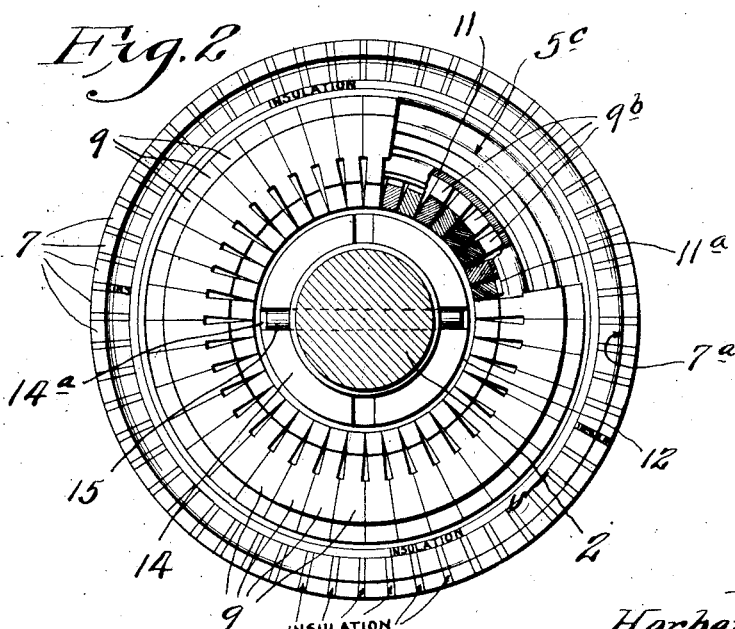

1,435,827

UNITED STATES PATENT OFFICE.

HERBERT I. FINCH, OF ST. LOUIS, MISSOURI, ASSIGNOR TO THE EMERSON ELECTRIC MANUFACTURING COMPANY, OF ST. LOUIS, MISSOURI, A CORPORATION OF MISSOURI.

ELECTRIC-MOTOR SHORT-CIRCUITING MECHANISM.

Application filed June 12, 1920. Serial No. 388,495.

*To all whom it may concern:*

Be it known that I, HERBERT I. FINCH, a citizen of the United States, residing at St. Louis, Missouri, have invented a certain new and useful Improvement in Electric-Motor Short-Circuiting Mechanism, of which the following is a full, clear, and exact description, such as will enable others skilled in the art to which it appertains to make and use the same, reference being had to the accompanying drawings, forming part of this specification.

This invention relates to a new and useful improvement in short-circuiting devices for induction-repulsion motors and is designed particularly as an improvement upon the devices of this character shown in the Bretch Patent, No. 1,111,358, dated September 22, 1914.

In general the operation of an induction-repulsion motor is briefly as follows:

In starting, a commutator is used in conjunction with a set of short-circuited brushes to short-circuit a definite portion of the armature winding which is in the proper relation with respect to the stator winding, to develop a torque whereby it is possible for the motor to attain a predetermined speed, after which the commutator is short-circuited and the motor thereafter operates as an induction motor. In attaining this starting torque and high speed, it is necessary that certain armature coils be short-circuited and this result is obtained by means of the commutator co-operating with the short circuited brushes. Then when the motor approaches or attains a predetermined high speed, centrifugally operated devices are thrown outwardly to short-circuit the commutator and likewise short-circuit the coils, the motor thereafter operating as a motor of the induction type. When the speed of the motor is reduced, or the motor comes to rest, these short-circuiting devices move away from, or inwardly off of, the commutator segments whereby the coils are commutator-controlled and rendered effective for another starting operation.

In the construction shown in the Bretch patent it has been found that short-circuiting segments, under certain conditions, have a tendency to become loose and fall out of adjustment. Again, under certain other conditions the short-circuiting segments of the Bretch patent are liable to stick and not come back to the proper position when the motor is approaching a position of rest, this sticking being due sometimes to a displacement of the insulation between the commutator sections and the commutator shell or the absence of insulation at this point.

In the present construction, the tendency of the segments to fall out of adjustment or become displaced has been corrected by the provision of a keeper ring which prevents the inner hooked ends of the short-circuiting segments from moving inwardly and becoming displaced. The shape of the face of the short-circuiting segment where it contacts with the commutator shell and commutator segments has been changed from that disclosed in the Bretch patent so that it will entirely bridge or rock over the insulation, thus giving no opportunity for the short-circuiting segments to stick or hang when moving from the running to the stop position or vice versa.

In brief, the object of the present invention is to improve the Bretch construction by making it more positive and certain in its action in avoiding the defects of operation, slight though they may be, and which have been discovered in the actual operation of the Bretch construction.

Referring to the drawings,—

Figure 1 is a side elevational view partly in section through a motor equipped with my improved short-circuiting device.

Figure 2 is a front elevational view partly in section of the commutator segments and short-circuiting devices.

Figure 3 is an enlarged view of the short-circuiting segments in their short-circuiting position.

Figure 4 illustrates the position of the segments when they start to rock over the insulation as the motor decreases its speed.

Figure 5 shows the short-circuiting segments rocked over the insulation and in readiness when the motor comes to rest to be seated in the lateral groove in the face of the commutator shell supporting them.

Figure 6 is a detail view of one of the short-circuiting segments.

In the drawings, 1 indicates the motor casing, 2 the armature shaft, 3 the armature or rotor and 4 the field core. 5 indicates the commutator shell secured to the armature shaft by a pin 6 and carrying commutator segments 7 in its periphery, which armature segments are insulated from the shell.

The shell is undercut, as at 5ª, and the securing ring 8 is also undercut so that the dovetailed inner edges of the commutator segments together with the insulation therebetween and the commutator shell are securely held in position,—the securing ring 8 being secured in place by spinning over a flange 5ᵇ on the commutator shell. The provision of an integrally spun flange avoids the use of bolts or other detachable securing means, to hold the ring 8 in place and makes a tight fastening. The outer face of the commutator shell is formed with a concentric shoulder seat 5ᶜ in which the inner faces of the heads of the short-circuiting segments 9 are intended to be caught and arrested when the speed of the motor decreases in approaching a cessation of rotation.

By referring in Figure 6, it will be noted that the short-circuiting segments are provided with enlarged heads, the inner faces of which are inclined or beveled, as at 9ª, so as to fit the concentric groove 5ᶜ in the commutator shell. These short-circuiting segments 9 have a hook 9ᵇ at their inner ends which engage an inturned flange 11ª of a keeper ring or member 11 slidingly mounted on the shaft 2. Within this ring and also slidingly mounted on the shaft is a supporting collar 12 having a flange extending parallel to the shaft and which is arranged under the inner ends of the short-circuiting segments 9, thus preventing their inward displacement. 13 indicates a spring tending at all times to force the rings 11 and 12 inwardly, said spring bearing at its outer ends against a nut 14, which nut is threaded on the shaft and provided with cross slots or grooves 14ª in its lower face, in which is seated the ends of a locking pin 15 passing through an opening in the shaft 2. By this means compression of spring 13 may be adjusted and the nut 14, after the proper adjustment is effected, locked in position.

The operation of the device is as follows: Assuming that the motor is at rest and the short-circuiting segments are in the position shown in Figure 1. Current is now supplied to the motor.

In starting, certain armature coils are short-circuited by means of short-circuited brushes, not shown, resting on segments 7, thus developing a torque, and as the motor gains speed the heavy outer ends of the short-circuiting segments move outwardly under the action of centrifugal force, the outward movement of the heads of the short-circuiting segments compressing the spring 13. The beveled or inclined faces 9ª of the short-circuiting segments cause them in their outward movement, when the motor attains the requisite predetermined speed, to rock from one edge to the other so that the insulation between the commutator shell and commutator segments is bridged and the liability of any segment hanging or sticking in this outward movement is reduced to a minimum. I do not in this application claim the construction of the short-circuiting segments having the beveled or inclined faces 9ª whereby the enlarged outer ends of said short-circuiting segments, by virtue of said beveled or inclined faces, rock from one edge to the other, so that the insulation between the commutator shell and the commutator segments is bridged, as the same forms the subject matter of Patent No. 1,373,314, issued March 29, 1921.

The outward movement of the short-circuiting segments is arrested by shoulders 7ª formed on the commutator segments so that in their final position, as shown in Figure 3, the short-circuiting segments rest against this shoulder and further outward movement thereof is stopped.

When the speed of the motor is reduced, as when being brought to a state of rest by shutting off the current thereto, the energy of spring 13 is exerted to force the rings 11 and 12 inwardly and draw the heads of the short-circuiting segments away from the commutator segments. In the position of the parts shown in Figure 4, assuming that the motor is coming to a position of rest, it will be seen that, as the short-circuiting segments move inwardly, they start to rock approximately at a point opposite the insulation and bridge the insulation, until attaining the position shown in Figure 5, after which they are moved to the position shown in Figure 1. The fulcrum or pivot about which the short-circuiting segments move inwardly and outwardly relative to the shaft in the above described operation is formed by the engagement between the hooked inner ends of said segments and the inturned flange of the ring 11.

What I claim is:

1. A centrifugally operated commutator short-circuiting device for motors comprising the combination of short-circuiting segments having hooks at their inner ends, a keeper ring having an inturned flange with which the hooks of said segments cooperate, and a supporting ring for preventing the disengagement of the hooks of the segments from the flanges of the keeper ring.

2. A centrifugally operated commutator short-circuiting device for motors comprising the combination of an armature shaft, a keeper ring slidably mounted on said shaft and having an inturned flange, a spring surrounding said shaft and engaging said keeper ring, short-circuiting segments having hooked ends engaging the flange of said ring, and a supporting ring embracing a portion of said spring and located in juxtaposition to said hooked ends of the short-circuiting segments and movable with said flanged spring-pressed ring for preventing inward displacement of the hooked ends of said short-circuiting segments.

3. In a motor, the combination with a commutator shell having a shouldered groove at its outer end, and commutator segments arranged around said shell, insulated therefrom and provided with shoulders, of a centrifugally operated commutator short-circuiting device comprising segments designed to be seated in said groove when the motor is at rest and to be arrested in their outer movement by said shoulder when the motor has attained a certain speed.

4. In a motor, in combination with a commutator shell having a shouldered groove at its outer end, commutator segments arranged around said shell and insulated therefrom, and a centrifugally operated commutator short-circuiting device comprising segments designed to be seated in said groove when the motor is at rest and to move outwardly when the motor is rotated at a predetermined speed.

In testimony whereof I hereunto affix my signature this 8th day of June, 1920.

HERBERT T FINCH.